US008162670B2

(12) United States Patent
Hacke

(10) Patent No.: US 8,162,670 B2
(45) Date of Patent: Apr. 24, 2012

(54) METHOD OF MOUNTING A GAME ANIMAL AND KIT THEREFOR

(76) Inventor: Andrew Hacke, Abingdon, MD (US)

( * ) Notice: Subject to any disclaimer, the term of this patent is extended or adjusted under 35 U.S.C. 154(b) by 889 days.

(21) Appl. No.: 12/231,543

(22) Filed: Sep. 2, 2008

(65) Prior Publication Data

US 2009/0075245 A1 Mar. 19, 2009

Related U.S. Application Data

(60) Provisional application No. 60/967,170, filed on Aug. 31, 2007.

(51) Int. Cl.
*G09B 23/00* (2006.01)
(52) U.S. Cl. ............................ 434/296; 434/295; 428/16
(58) Field of Classification Search .................. 434/295, 434/296; 428/16, 542.4
See application file for complete search history.

(56) References Cited

U.S. PATENT DOCUMENTS

| 453,008 | A | * | 5/1891 | Kaempfer | 248/314 |
|---|---|---|---|---|---|
| 2,003,896 | A | * | 6/1935 | Menger | 434/296 |
| 2,755,165 | A | * | 7/1956 | Lepaw | 8/94.11 |
| 2,831,271 | A | * | 4/1958 | Stitt | 434/296 |
| 3,200,515 | A | * | 8/1965 | Daigre | 434/296 |
| 3,501,862 | A | * | 3/1970 | Austin | 446/372 |
| 4,464,440 | A | * | 8/1984 | Dotzman | 428/542.4 |
| 4,717,626 | A | * | 1/1988 | Badger | 428/542.4 |
| 4,775,323 | A | * | 10/1988 | Johnson | 434/296 |
| 4,971,865 | A | * | 11/1990 | Nowlan | 428/542.4 |
| 5,015,532 | A | * | 5/1991 | Knight | 428/542.4 |
| 5,149,271 | A | * | 9/1992 | Marvich | 434/295 |
| 5,472,765 | A | * | 12/1995 | Green | 428/99 |
| 6,901,693 | B1 | * | 6/2005 | Crowe | 43/2 |
| 2006/0154224 | A1 | * | 7/2006 | St.Ama | 434/296 |

OTHER PUBLICATIONS

Farnham, Albert B., "Home Taxidermy for Pleasure and Profit", Copyright, 1944, A.R. Harding Pub. Co., Chapters XVII and XVIII, reproduced at http://doit101.com/Taxidermy/chap1718and19.htm.*

* cited by examiner

*Primary Examiner* — Alvin A Hunter
*Assistant Examiner* — Joseph B Baldori
(74) *Attorney, Agent, or Firm* — Ober, Kaler, Grimes & Shriver; Royal W. Craig

(57) ABSTRACT

The present invention is a kit and method of mounting a game animal that allows for antlers or horns to be quickly added or interchanged to an otherwise artificial mount. The method generally comprises the following steps: measuring the game animal, taking at least one picture of the game animal, caping the head, cutting the skull, boiling the skull cap, selecting the form, cutting the skull cap to fit the selected form, drilling holes in the skull cap, adding clay to the form, fitting the skull plate to the form, placing screws through the holes in the skull cap, covering the skull cap attached to the form with flaps from the artificial hair, trimming the excess material from the flaps, tucking the flaps around the antler or horn base, and bending the ears of the form to the desired position. The above-described method creates an odorless trophy that is durable, will remain intact for decades, and which has more consistent, lifelike, and more realistic facial features. The method is time efficient, inexpensive, and can be performed for game animals of all species, sizes, and sexes.

10 Claims, 13 Drawing Sheets

METHOD OF MOUNTING A GAME ANIMAL AND KIT THEREFOR

CROSS-REFERENCE TO RELATED APPLICATION(S)

The present application derives priority from U.S. provisional application Ser. No. 60/967,170 filed 31 Aug. 2007.

BACKGROUND OF THE INVENTION

1. Field of the Invention

The present invention generally relates to a method of mounting a game animal and kit for facilitating the method and, more particularly, to a kit and method that allows for game antlers or horns to be quickly added to a fully artificial, lifelike, and realistically sized mount.

2. Description of the Background

Taxidermists use different techniques and methods to preserve and prepare game animals for display. These procedures involve removing the hide of the animal and applying the hide over an artificial form, and adjusting the hide and form until it appears lifelike. Taxidermists often use the animal's actual hide, hair and fur in preparing trophies, and consequently the finished trophy mount often develops an unpleasant odor and attracts insects, if not properly preserved. Moreover, the hides degrade over time and if not preserved properly, may become fraught with blemishes, lose hair/fur and bear hairless and discolored spots. Despite attempts to make the trophies appear lifelike, prior art trophies have flaws in the finished products including repaired holes and unrealistic taxidermy artwork. Additionally, most prior art trophies provide no ability to interchanging the racks (antlers) in the event that the hunter shoots or bags a larger kill and wants to simply replace the rack on the trophy instead of mounting an entirely new trophy.

For example, United States Patent Application 20070023601 by Peek, Russell Van published Feb. 1, 2007 shows a taxidermy trophy mounting device comprising a support platform with a rebar rod protruding therefrom for securing an animal mount, such as a skull. The rod uses the natural occurring or existing hole(s) in the back of the skull for support thereof. The rod may extend straight from the support platform or may comprise a bent portion at a distal end thereof.

United States Patent Application 20030198926 by Martin et al. (McKenzie Supply) and U.S. Pat. No. 6,799,974 issued Oct. 5, 2004 both show a taxidermy head mannequin and mouth assembly that uses a commercially available jaw set inserted into a mouth shell, which has upper and lower jaws, lips, a chin and a nose.

U.S. Pat. No. 6,458,434 to Coombs, Jr. (Joe Coombs Classics, Inc.) issued Oct. 1, 2002 shows a pedestal mounted taxidermy mannequin, and a mold for manufacturing same. Once molded, the taxidermy mannequin includes an elongated, bored hole formed in a bottom portion thereof, and a rigid block embedded inside near the bored hole. A rod is inserted into the bored hole to mount the mannequin to a pedestal. The mold for manufacturing the mannequin is an injection mold into which an elongated rod is inserted after the polyurethane has been injected therein. Just prior to hardening of the polyurethane, the end is removed, leaving a bored hold in the mannequin.

U.S. Pat. No. 5,472,765 to Green issued Dec. 5, 1995 shows a shed antler mounting kit including a model skull replica having provision for attachment of shed antlers, a wedgelike mounting interface, and a plaque with an engraved placard. The skull replica is devised to mimic an animal skull of the same character as the originator of the shed antlers.

U.S. Pat. No. 4,464,440 to Dotzman issued Aug. 7, 1984 shows a trophy mount which includes a simulated skull structure, configured to resemble the upper portion of the head of the animal involved, with the simulated skull encapsulated in a material, such as leather, vinyl, or other sheet material. The simulated skull includes a pair of upraised laterally spaced, horn-securing regions, an elongated bore in each region, and an elongated, horn-receiving dowel secured in each bore and protruding therefrom. The simulated skull is secured to a plaque or support panel by an elongated, obliquely-oriented extension brace for display on a wall or table top.

U.S. Pat. No. 4,432,919 to Rinehart issued Feb. 21, 1984 shows a method of making a composite foam taxidermy mannikin using a mold cavity with eye socket recesses surrounded by a correctly contoured surface having reference indicia marking.

U.S. Pat. No. 4,775,323 to Johnson (American Institute of Taxidermy, Inc.) issued Oct. 4, 1988 shows a horned animal head mannikin with a recessed flat skull surface between upstanding front and rear walls, with a domed ridge upstanding from the flat surface and extending from the front wall to the rear wall, being centered longitudinally on the mannikin and the flat surface. The convex top surface of the ridge has a curvature approximately matching the curvature of the underside concavity of the skull plate of a horned animal. The domed ridge is widest and highest at about its midportion curving to lesser widths and lesser heights at its ends at the upstanding walls. A fastening plate is disposed under the ridge.

U.S. Pat. No. 6,884,080 to Thompson (Matt Thompson Taxidermy & Supply, Inc.) issued Apr. 26, 2005 shows a taxidermy form and method comprising opposing face pieces (halves) with eye openings and nostrils which overlay an inner core having eye sockets, eyeballs, nasal cavities, and a nostril septum to form realistic eye settings and noses.

U.S. Pat. No. 5,567,161 to Kallina issued Oct. 22, 1996 shows a method, kit, and artificial septum for the preparation of a septum for a taxidermy manikin.

U.S. Pat. No. 4,717,626 to Badger issued Jan. 5, 1988 shows a trophy mount that uses an epoxy base completely surrounding a bone bridge joining a pair of antlers or horns. The base is mounted on a support plaque.

While the above and other known trophy mounts may provide materials and means for assembling a trophy mount, none provide a method or means for mounting a fully artificial game animal including artificial hair or fur, and a means for quickly adding or interchanging the antlers or horns to provide a durable trophy mount. Therefore, it would be greatly advantageous to provide a kit and method of mounting a durable trophy that is fully artificial with the option of adding various trophy horns or antlers.

SUMMARY OF THE INVENTION

It is, therefore, a primary object of the present invention to provide a kit and method of mounting a game animal that allows the antlers or horns to be easily attached or interchanged with other antlers or horns of the same species.

Another object of the present invention is to provide a kit and method of mounting a game animal, wherein the trophy is durable and will remain intact for a long length of time.

Another object of the present invention is to provide a kit and method of mounting a game animal, wherein the mounted animal has consistent, lifelike, and realistic facial features made to replicate the animal of choice.

Yet another object of the present invention is to provide a kit and method of mounting a game animal antlered or antlerless.

Still another object of the present invention is to provide a kit and method of mounting a game animal that is simple and time efficient, allowing hunters to construct their own trophies as well as allowing taxidermists to serve their clients in a much shorter timeframe.

It is still another object of the present invention to provide a kit and method of mounting a game animal that is inexpensive, especially on the labor end.

Yet another object of the invention is to provide a kit and method of mounting a game animal, wherein the mounted animal is odorless.

It is yet another object of the present invention to provide a kit and method of mounting game animals of all species, sizes, and sexes.

These and other objects are accomplished by a kit and method of mounting a game animal that generally comprises the following steps: measuring the game animal, taking at least one picture of the game animal, partially caping the head and removing the hair or fur from the antlers or horns, cutting the skull, boiling the skull cap to remove any remaining meat or membrane, selecting the correct sized and shaped form, cutting or trimming the skull cap to fit the selected form, drilling holes in the skull cap of the game animal, adding clay to fit the skull plate to the form, placing or drilling screws through the holes in the skull cap to attach to the form, covering the skull cap attached to the form with secured flaps of the artificial hair or fur, trimming the excess material from the flaps, tucking the flaps around the antler or horn base, and bending the ears of the form to the desired position. The method is simple, inexpensive, and time efficient.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Figure 1:
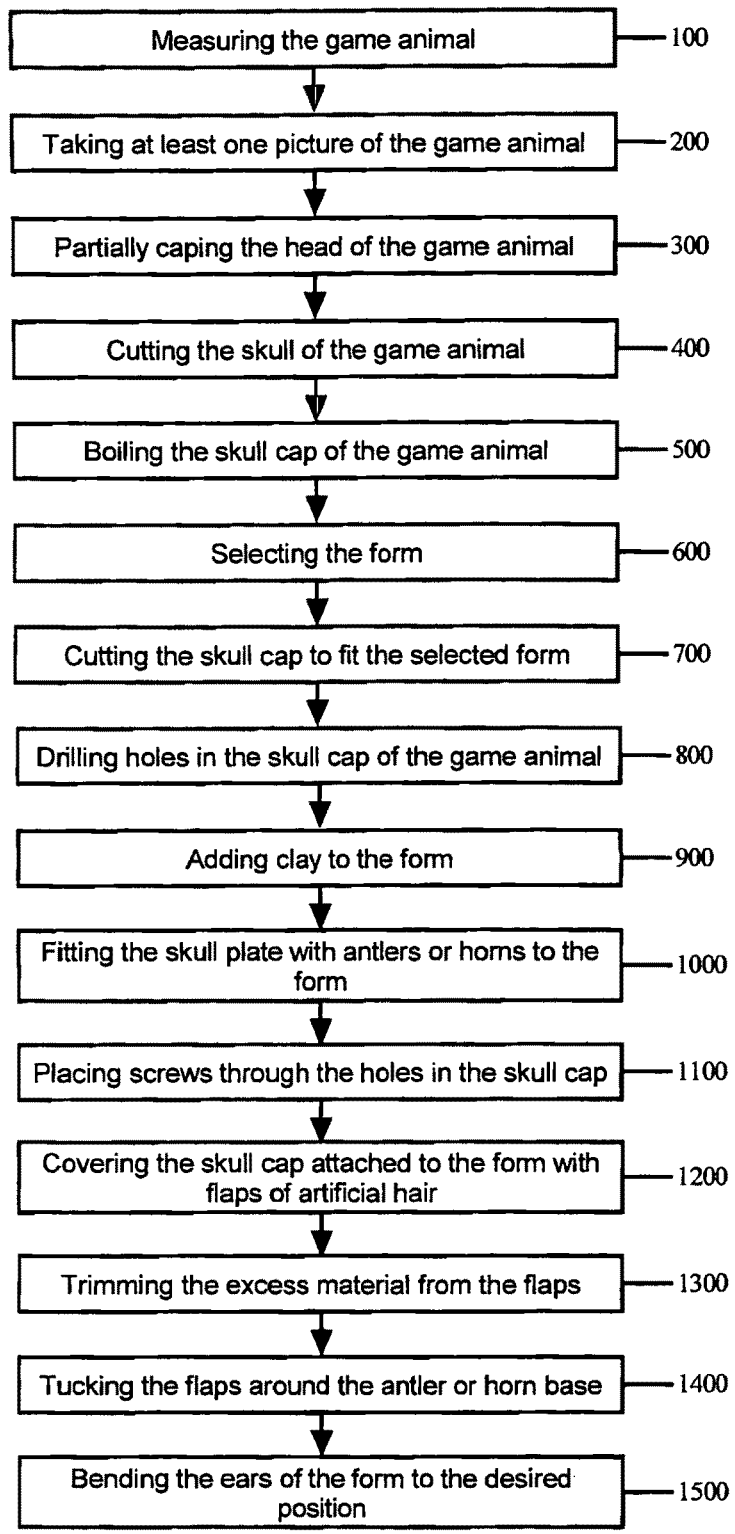
FIG. 1 is a flowchart of the general steps of the method of the present invention.

The present invention is both a kit for mounting a game animal as well as the method of mounting the game animal using the elements of the kit. The kit elements will be described as they are assembled by the step of the method to be detailed. FIG. 1 shows that the method of the present invention generally comprises the following steps:

Step 100. Measuring the game animal.
Step 200. Taking at least one picture of the game animal.
Step 300. Partially caping the head of the game animal.
Step 400. Cutting the skull of the game animal.
Step 500. Boiling the skull cap of the game animal.
Step 600. Selecting the form.
Step 700. Cutting the skull cap to fit the selected form.
Step 800. Drilling holes in the skull cap of the game animal.
Step 900. Adding clay to the form.
Step 1000. Fitting the skull plate with antlers or horns to the form.
Step 1100. Placing screws through the holes in the skull cap.
Step 1200. Covering the skull cap attached to the form with flaps of artificial hair.
Step 1300. Trimming the excess material from the flaps.
Step 1400. Tucking the flaps around the antler or horn base.
Step 1500. Bending the ears of the form to the desired position.

One skilled in the art will understand that the preceding steps do not necessarily need to be performed in the sequential order disclosed, but so long as all are performed the result will be a mounted game animal 1 with real rack of antlers or horns 2, yet created from a fully artificial mount, including artificial hair or fur 13, eyes, facial features, and distinctive parts (nose, snout, eyelashes, whiskers, etc. . . . ) that all cover a polyurethane form, and wherein the antlers or horn 2 can be quickly added or interchanged.

The foregoing steps are described below in further detail.

Step 100. Measuring the game animal 1. It is important to precisely measure the game animal 1 to ensure that the proper mannikin or "form" sized is used, when mounting the animal. If the measurements are incorrect, the trophy will not replicate the actual size of the game and may appear abnormal. Additionally, all of the measurements should be taken directly after the game animal 1 has been killed, because as time passes the animal's bones will dry and will lose a small amount of width from shrinkage.

Figure 2:
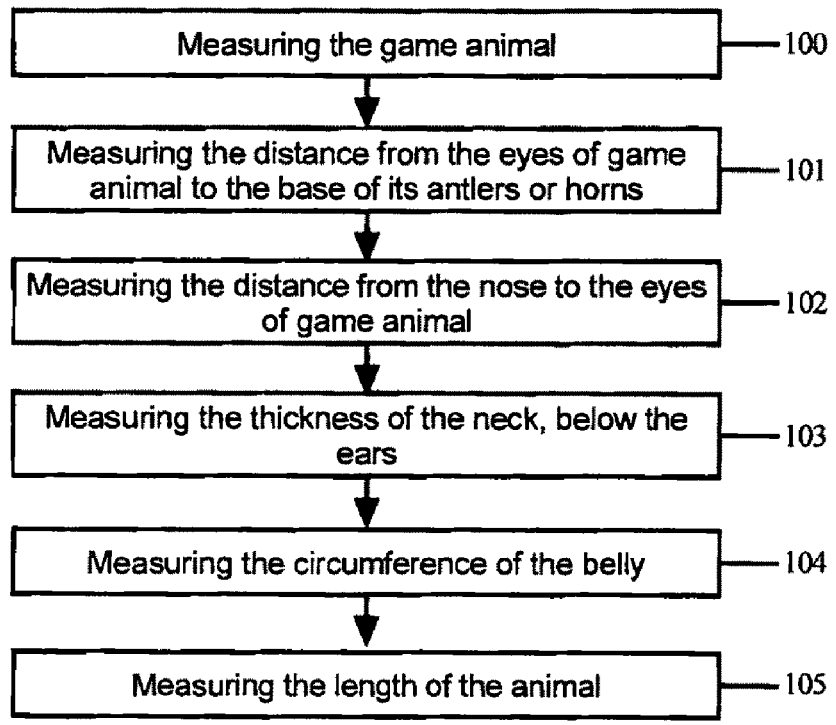
FIG. 2 is a flowchart of the substeps of Step 100.

The game animal 1 may include any number of different animals including deer, elk, caribou, africans, and all game animals. It is understood that this invention is not limited to the particular embodiment or game disclosed, but it is intended to cover modifications of all game animals within the spirit and scope of the present invention. Different game species have different antlers or horns that may require special treatments for preservation (ex: Velvet, Ram Horns, etc. . . . ). FIG. 2 shows the substeps of Step 100 as follows:

Substep 101. Measuring the distance from the eyes of game animal 1 to the base of its antlers or horns 2.

Substep 102. Measuring the distance from the nose to the eyes of game animal 1.

Substep 103. Measuring the thickness of the neck 6, below the ears.

Substep 104. Measuring the circumference of the belly.

Substep 105. Measuring the length of the animal.

Substep 101 involves measuring the distance from the eyes of game animal 1 to the base of its antlers or horns 2. Specifically, measure the distance from the outside corner of each eye to the base of each horn or antler 2. You may use a measuring stick or ruler to measure distances on the animal, however your line of sight will vary greatly. Thus, it is preferable to use a caliper for the most precise measurement.

Substep 102 involves measuring the distance from the nose to the eyes of game animal 1. Particularly, measure the distance from the front center of the nose to the bone on the inside corner of the eye.

Substep 103 involves measuring the thickness of the neck 6, below the ears. This measurement could be taken before caping in step 300, although it is recommended to take measurements from the carcass after the skin has been removed. Measure the circumference of the neck 6 at the throat and around the neck 6 crossing the atlas of the neck 6. Then measure the circumference of the neck 6 three inches down from the first neck 6 measurement. These two measurements coupled together will provide an indication of the amount of swell of an animal's neck 6. Then measure the circumference of the neck 6 tight to the head. For all of the measurements, if they are taken prior to skinning then the hair and skin thickness (usually 2 inches) should be subtracted from the measurements for whitetail deer, which is the example disclosed herein. For other game species, these measurements will vary due to thickness of the hair or fur.

Substeps 101-103 are performed for a shoulder mounted game animal 1. Substeps 104-105 are additionally performed if the game animal 1 is to be mounted on a full body life-size form. Substep 104 requires measuring the circumference of the animal's belly. Following this is substep 105, wherein the length of the animal is measured by measuring the distance from the tip of the nose to the base of the animal's tail.

The foregoing measurements are used in determining and selecting a proper form. One skilled in the art will understand that the measurements detailed in step 100 are simply illustrative and that additional or fewer measurements may be taken depending on the type of form to be used.

Step 200 should be performed before caping or skinning the animal and involves taking at least one picture of the game animal 1. The hunter or taxidermist should take at least one, and preferably a number of pictures of the game animal 1. This will help in correctly positioning the horns or antlers 2 onto a form. One can recall how the game animal 1 looked when freshly slain, and so this picture(s) will be especially useful later in the method at step 1100, when the horns are set onto the form.

Figure 3:
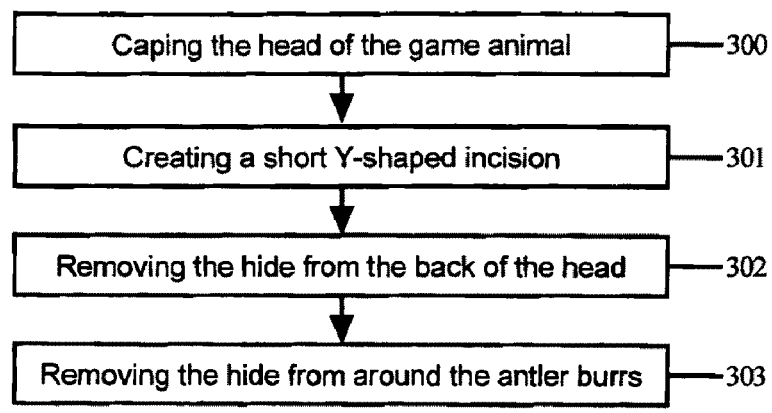
FIG. 3 is a flowchart of the substeps of Step 300.

Following step 200 is step 300 which involves caping the head of the game animal 1. This entails partially remove the cape of the animal 1, which is the hide around animal's skull, neck, and shoulders, prior to removing the antlers or horn. The result of the caping should be that there is no trace of red meat, fat, or membrane on the skull plate that is attached to the antlers or horns 2. FIG. 3 is a flowchart showing that Step 300 comprises the following substeps:

Substep 301. Creating a short Y-shaped incision.
Substep 302. Removing the hide from the back of the head 3.
Substep 303. Removing the hide from around the antler burrs 2.

Figure 4:
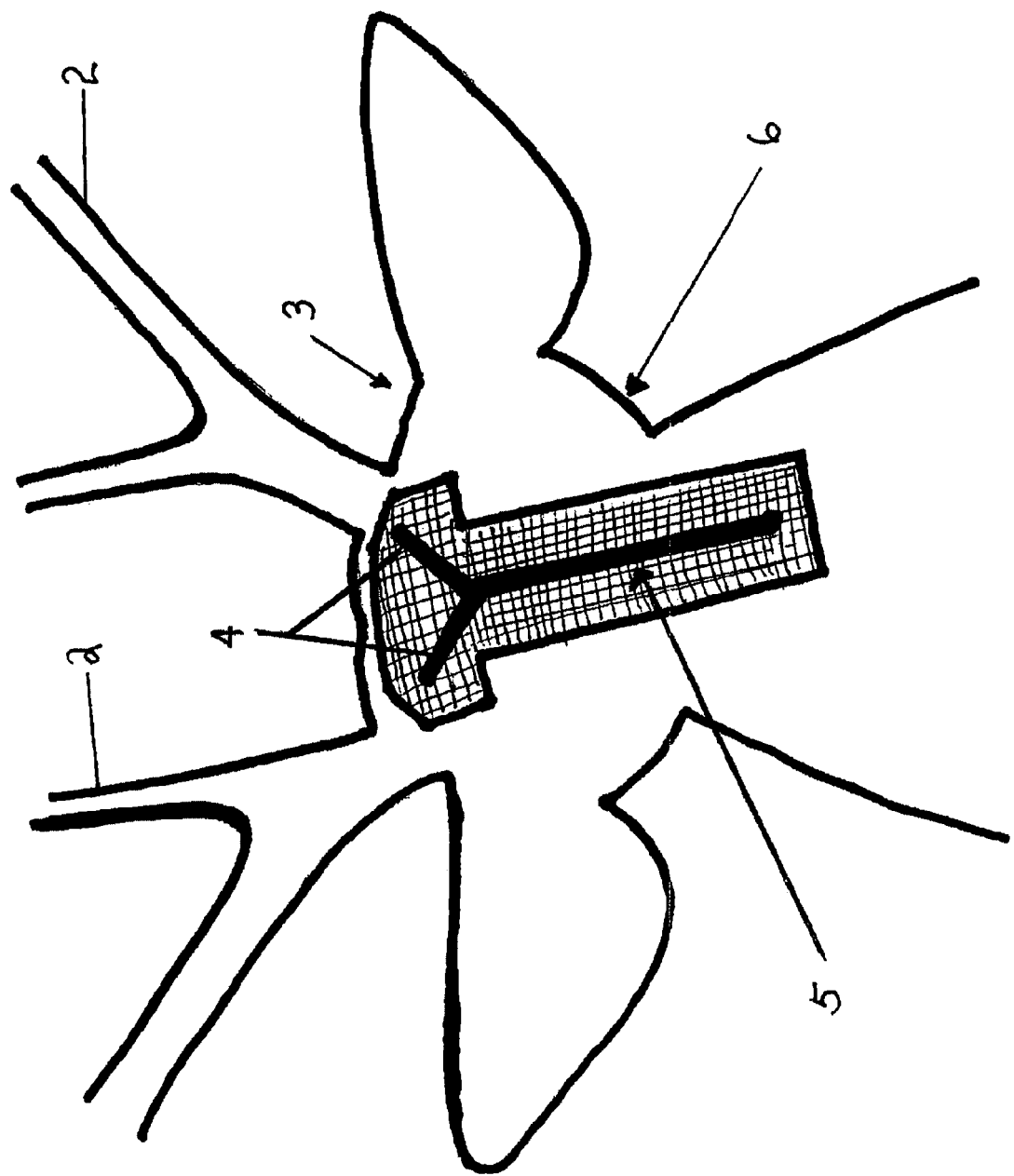
FIG. 4 is a perspective view of the Y-shape traced out for the incision.

Substep 301 involves creating a short Y-shaped incision. See FIG. 4 for a view of the Y-shape that is traced out before making the incision. Creating a Y-shaped incision involves making a cut from the back of one antler burr 2 to the middle of the head 3, and then making a cut from the opposite antler burr to the middle of the head 3. As seen in FIG. 4, the two cuts meet at a point in a V-shape 4. From this point, make a short cut 5 down the back of the animal's neck 6. The cut should be approximately down to the shoulders of the game. Following this is Substep 302, which involves removing the hide carefully from the back of the head 3. Leave the ear butts on and cut the ear canal as close to the skull as possible. Substep 303 follows, and involves removing the hide from around the antler burrs 2. Specifically, use a long screwdriver and hammer to remove the hide from around the antler burrs 2 by prying it off the antler 2 rather than cutting it. Remove enough skin to expose the neck for measurements.

Figure 6:
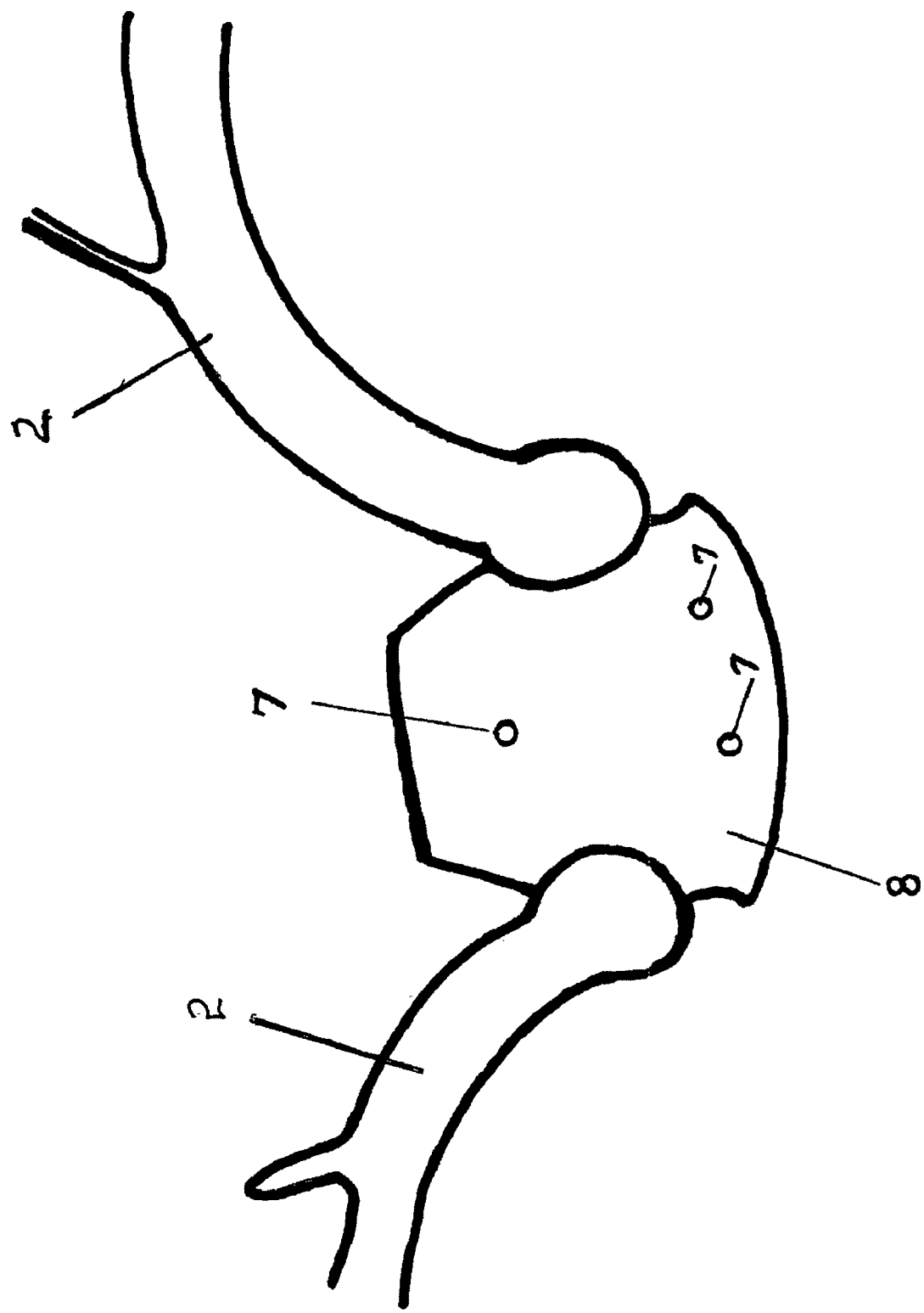
FIG. 6 is a perspective view showing step 800.

Generally, cutting or removing horns or antlers in step 400 involves cutting the skull cap 8 with the antlers or horns 2 attached atop, using a handsaw such as, for example, a crosscut handsaw. When cutting the skull cap 8 off from the remainder of the skull, it is important to saw through the skull beneath the antlers or horns 2, such that there is a continuous piece/bridge between the antlers or horns 2. It is important to cut the skull cap 8 carefully to conform to the crown of the form (described below in step 900). One skilled in the art will understand that each species' horns or antlers must be cut or removed differently. The proper skull cap 8 cut for a deer is as shown in FIG. 6. The skull cap 8 would be cut slightly differently for different species' horns or antlers. For example, the skull cap for an antelope would be cut at different angles than that of the deer.

Figure 5:
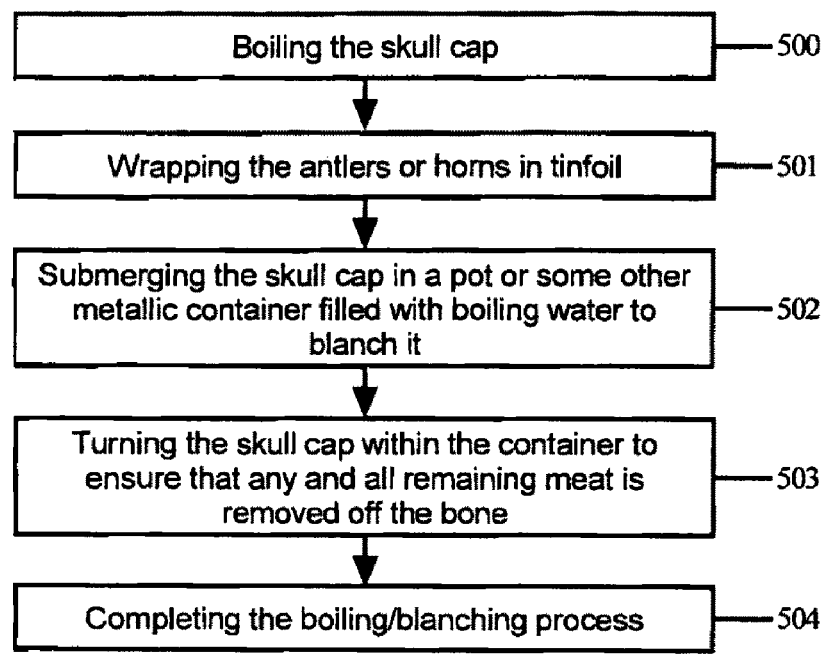
FIG. 5 is a flowchart of the substeps of step 500.

FIG. 5 is a flowchart of the substeps of step 500, which involves boiling the skull cap 8. Step 500 comprises the following substeps:

Substep 501. Wrapping the antlers or horns 2 in tin foil.
Substep 502. Submerge the skull cap 8 in a pot or some other metallic container filled with boiling water to blanch it.
Substep 503. Turn the skull cap 8 within the container to ensure that any and all remaining meat is removed off the bone.
Substep 504. Complete the boiling/blanching process.

More specifically, substep 501 involves wrapping the antlers or horns 2 in tinfoil. It is important to wrap the antlers 2 with tinfoil to avoid their contact with water, as water will unnaturally lighten the antlers 2 and hence adversely affect the appearance of the mounting animal. Additionally, wrapping tinfoil around the antler 2 will avoid staining the tips of the antlers 2 that exceed the brim of the pot, when an open flame is used to perform the boiling process.

Following this is substep 502, which involves submerging the skull 8 in a pot or some other metallic container filled with boiling water. The pot or container should be large enough to completely submerge the skull cap 8. It is preferable to perform the boiling process outside via propane or campfire. Once the water is boiling, the heat should be reduced to a simmer for about six hours.

Substep 503 follows wherein the skull cap 8 is turned while boiling to ensure that the stubborn meat is removed off the bone. Following this is substep 504, which involves completing the boiling process. Once the water has simmered for about six hours, the skull cap 8 may be removed from the water. The skull cap 8 should not boil for too much longer because it will disintegrate, and thus rather than allowing every last piece of meat to fall of the bone via boiling, any remaining meat should be removed with a small knife and tweezers. Also, any remaining hair or fur on the antlers or horns 2 should be carefully removed with tweezers, scissors, or some other suitable hair-removal tool.

Step 600 involves selecting a fully artificial form to be used to apply the trophy antlers or horns. The form incorporates the anatomy of each muscle and vein of the game animal 1, and is preferably a molded form made from lightweight polyurethane form with a wood skull mounting base and hook attached to the back for display and hanging if needed. The form is covered completely with artificial hair or fur, glass eyes, facial features, whiskers, eyelashes, and bendable or movable ears (using a wire like mechanism) that come together to replicate the animal of choice. In practice, the present method is implemented by selling the appropriate forms and other necessary components for one skilled in the art of taxidermy to attach a hide and antlers from a game animal. The disclosed invention will consist of forms that are available in many different sizes and styles, including shoulder forms, life size forms, pedestal mounts, rug mounts, and the desired form is specified upon ordering. Shoulder forms may include left turn shoulder, right turn shoulder, straight, or other preferred poses (including sneak, semi-sneak, etc.) depending on the way the taxidermist would like to depict the animal. Various manufacturers make forms, including McKenzie Taxidermy Supply, Matuska Taxidermy Supply Company, and Jetz Taxidermy Supply, and so the construct of the polyurethane form used herein is considered conventional. The measurements taken initially at step 100 should be compared to the measurements of different forms available, and then the form that is closest to the initial measurements of the game animal 1, should be selected.

Step 700 follows and involves cutting or trimming the skull cap 8 to fit atop the selected form. The initial measurements taken in step 100 will aid in cutting the skull cap 8 to fit the form exactly.

Step 800 follows and it involves drilling holes 7 into the skull cap 8. Three holes 7 are preferably drilled into the skull cap 8 as shown in FIG. 6. A drill may be utilized to drill three holes 7 in the top of the skull cap 8 between the antler or horn base (with two holes in the front and one in the back). A RYOBI® cordless drill may be used to perform the drilling. However, one skilled in the art will understand that any suitable tool may be used to perform the drilling. These holes 7 are drilled so that screws 14 may be placed through them in step 1200 to securely connect the skull cap 8 to the form.

Figure 7:
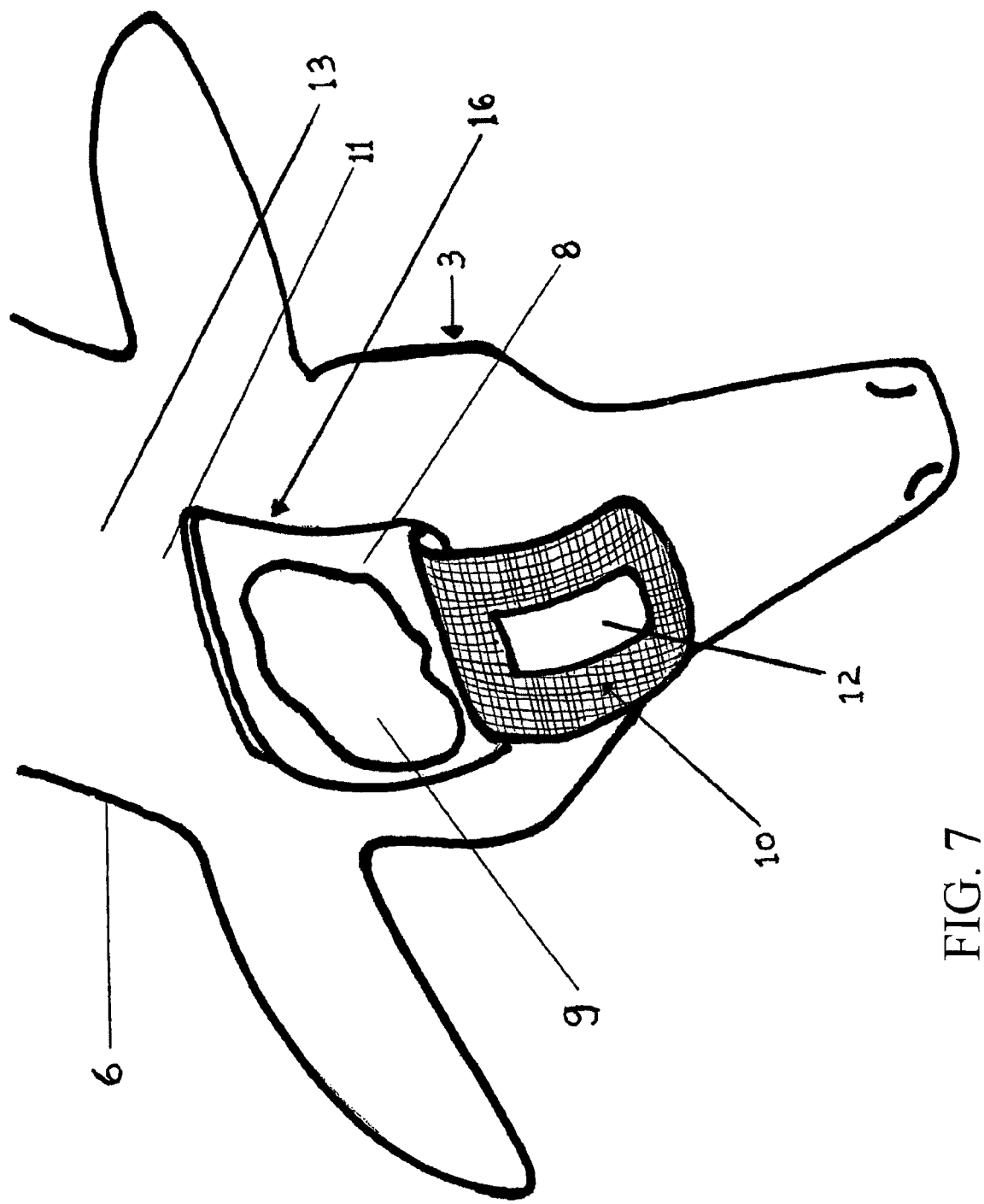
FIG. 7 is a perspective view showing step 900.

Following this is step 900, which involves adding (molding) clay 9 (or other hardening substance) to the form, as shown in FIG. 7, to fill or build up around the skull plate 8. Preferably, ceramic taxidermy clay 9 should be used, although polymer or epoxy clay may also be used. Other substances, such as straw or other fibrous webbing, can be used beneath the clay to help mold the skull. The clay/straw 9 helps fit the skull plate 8 with antlers or horns 2 to the form exactly. The substance should be able to be taken out or broken off in the future if replacing horns or antlers is desired. Refer to the picture taken in step 200, to fit the skull plate 8 with antlers or horns 2 to the form in step 1000, such that the antlers or horns 2 fit the form in a realistic manner and accurately depict the game animal 1. Shims or wedge pieces may be placed underneath the skull plate 8 to fit it and the antlers 2 to the form, if needed. Pull flaps over skull plate temporarily. If horns 2 or antlers depict the desired look, then continue to step 1100.

Figure 8:
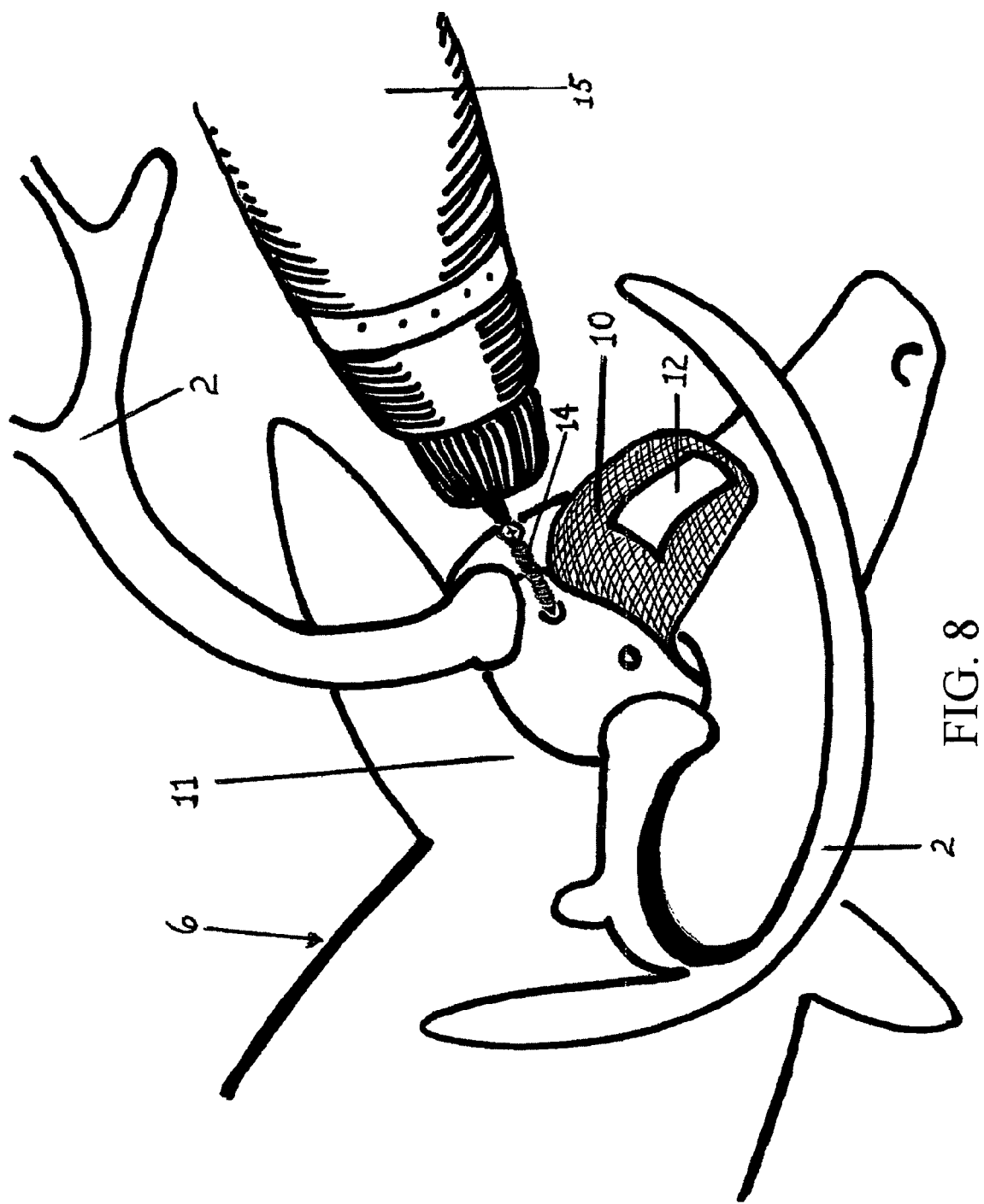
FIG. 8 is a perspective view showing step 1100.

Step 1100 follows wherein screws 14 are placed through the pre-drilled holes 7 in the skull cap 8, with the threads of the screws 14 reaching into the wood skull mounting base in the form (not shown). This method is currently used to attach horns or antlers to traditional polyurethane forms before the hide is attached. A drill 15 may be used to place the screws, as shown in FIG. 8. The screws 14 should not be over tightened as this would cause the scull to crack or move from the desired position. Hand tighten the screws 14 slowly to achieve the desired look. Filling substance will help secure rack after hardening. Fill any excess space with the clay substance.

Figure 9:
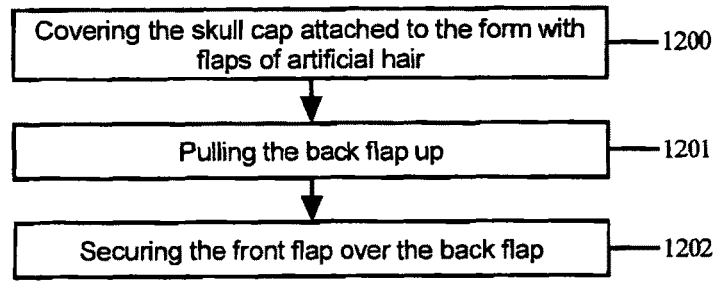
FIG. 9 is a flowchart of the substeps of step 1200.

Following this is step 1200, wherein flaps of artificial hair are folded over to cover the skull cap attached to the form. FIG. 9 is a flowchart of the substeps of step 1200, which are as follows:

Substep 1201. Pulling the back flap up 11.

Substep 1202. Securing the front flap 10 over the back flap 11.

Figure 10:
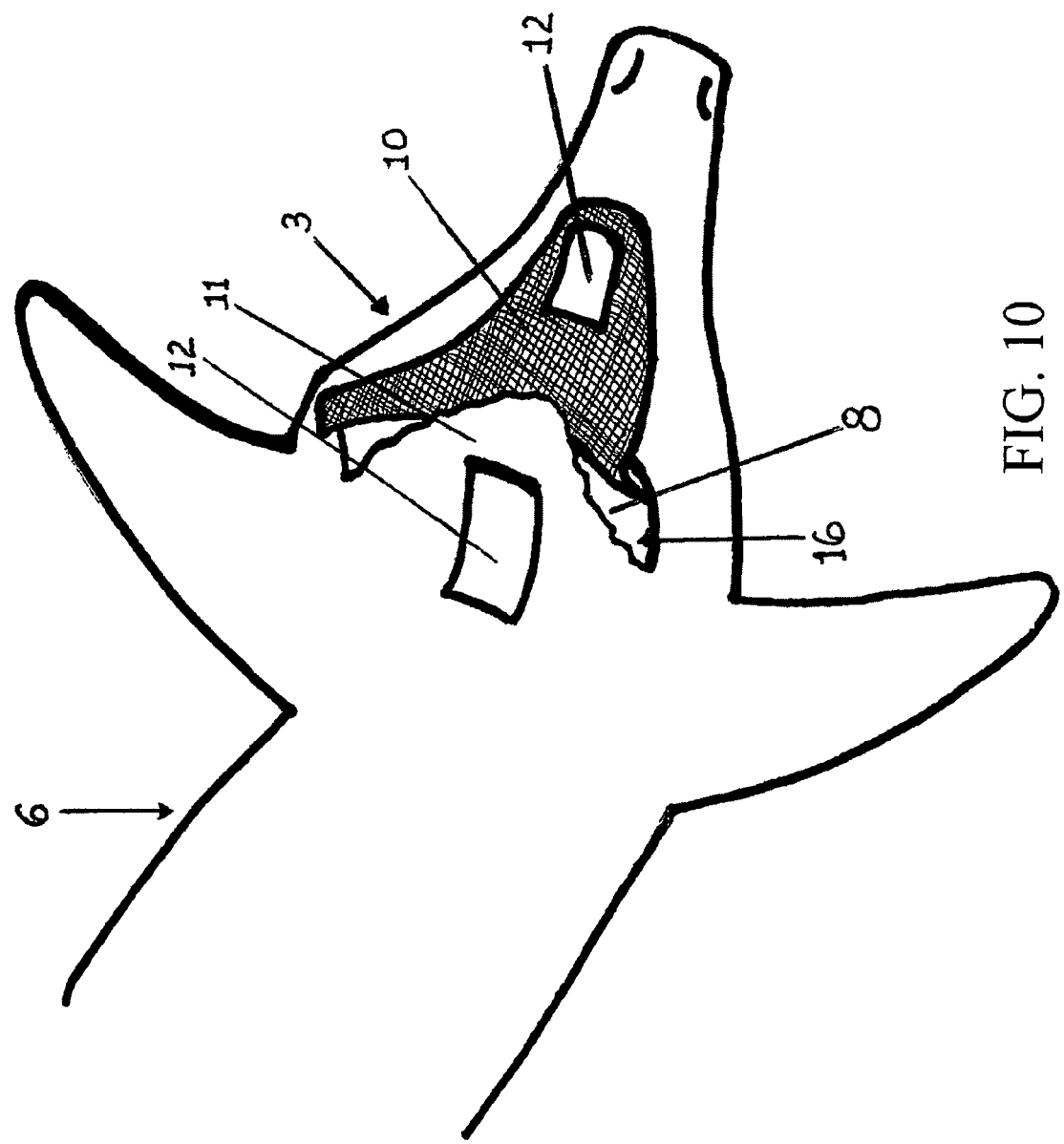
FIG. 10 is a perspective view of the flaps exposing the central opening.
Figure 11:
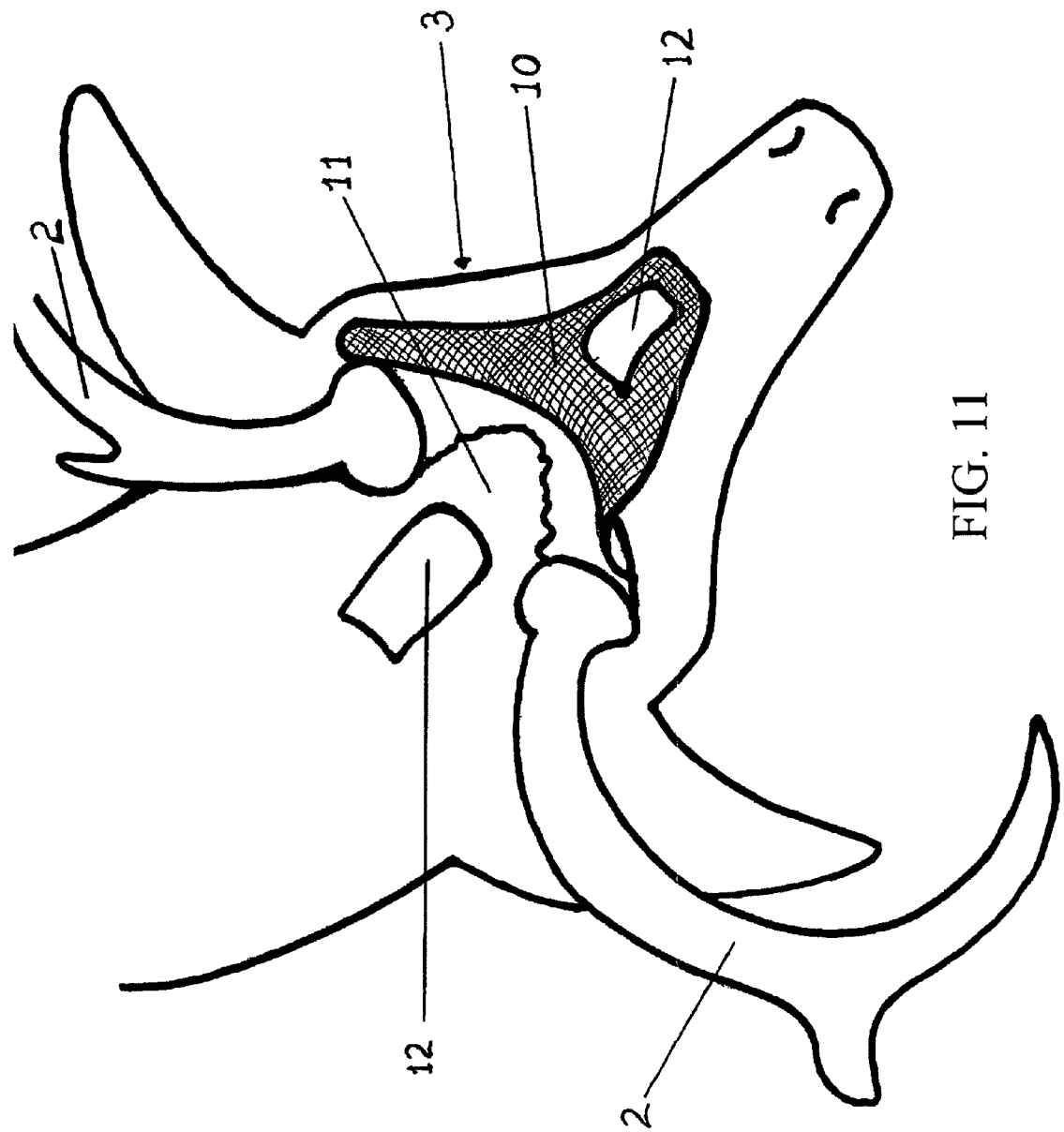
FIG. 11 is a perspective view of substep 1201.

As shown in FIG. 10, the front 10 and back flaps 11 are extensions of the artificial hair or fur that covers the top skull of the desired species. These extensions are triangular in shape and protrude from each side of the central opening 16 of the artificial hide covering the head 3. Flaps will vary in style or shape to accommodate the preferred species, so that the hair or fur fits properly around where the skull meets the base of the horns or antlers. If desired, the option of adding insect repellant to the artificial hair or fur 13 could be available in the production of the form. The front flap 10 includes hook and loop fasteners 12 (e.g. Velcro™ or some other type of fastener) applied to the rear of the flap 10, and the back flap 11 includes hook and loop fasteners 12 applied to the top of the flap 11. In substep 1201, the back flap 11 is pulled over the skull cap 8, between the antlers or horns 2 as shown in FIG. 11. In substep 1202, the front flap 10 is pulled over the back flap 11 to secure the artificial animal hair or fur 13 over the top of the head 3 of the game animal 1 mount. The flaps 10, 11 are coated on the inside with material that will pull away from the clay substance for future horn or antler substitution.

Figure 12:
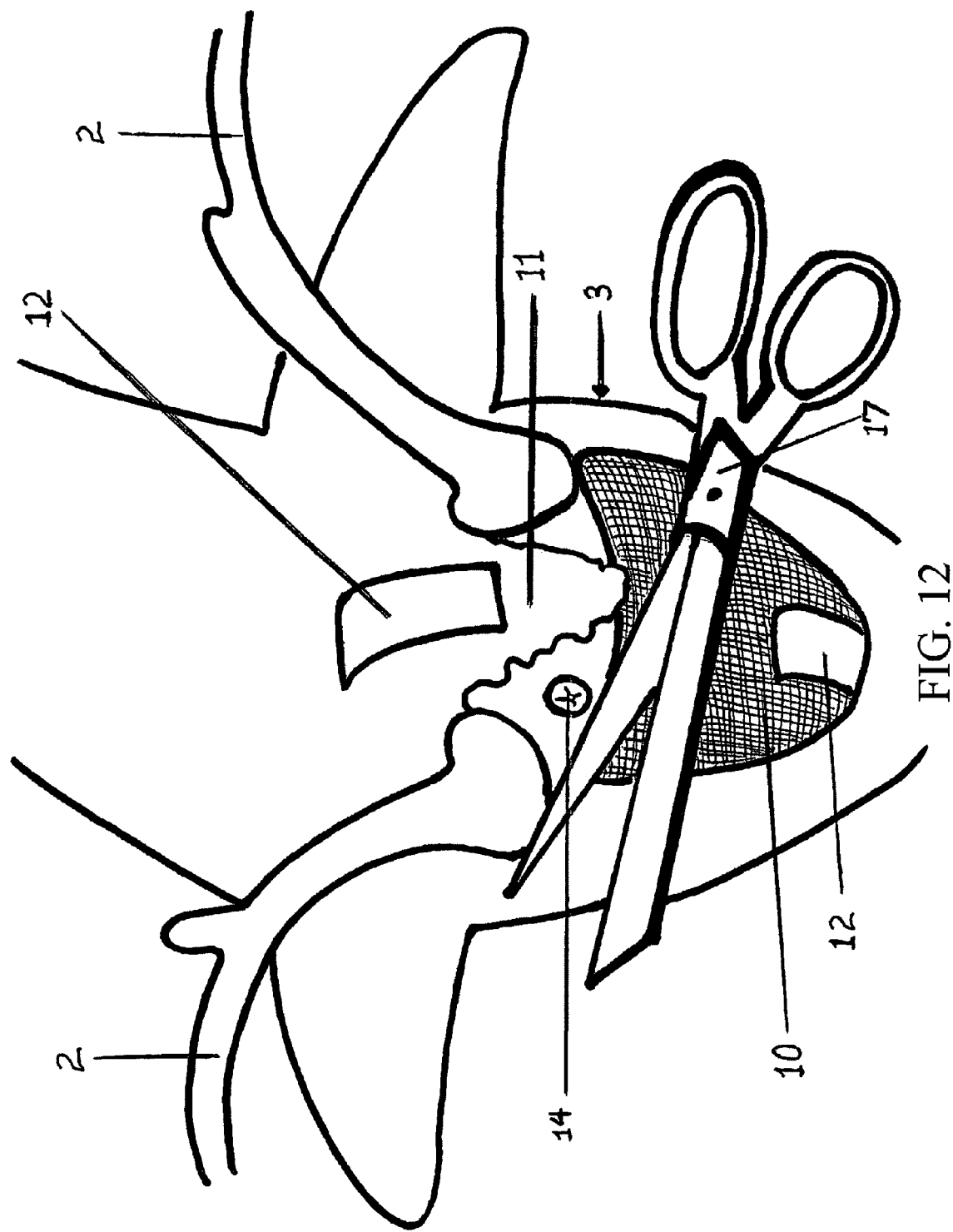
FIG. 12 is a perspective view of step 1300.

FIG. 12 is a perspective view of step 1300, which involves trimming the excess material from the flaps 10, 11 around the base of the horns or antlers. Scissors 17 can be used to trim either or both of the flaps 10, 11. In trimming the flaps 10, 11, ¼" of the flaps 10, 11 should be left around the outside of the antler or horn bases 2 to tuck.

Figure 13:
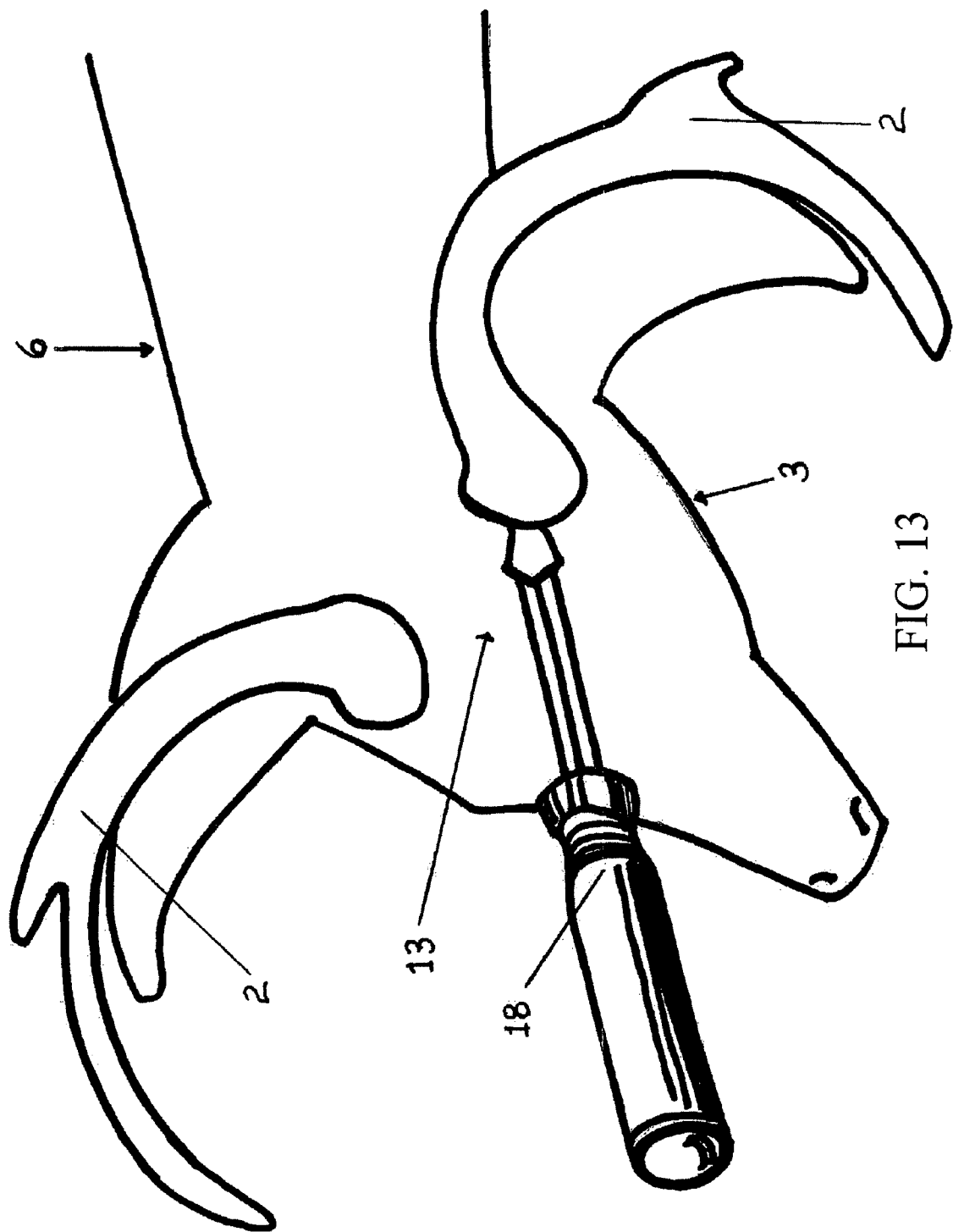
FIG. 13 is a perspective view of step 1400.

Step 1400 follows and involves tucking the flaps 10, 11 around the antler or horn base 2. Tuck the back flap 11 before tucking the front flap 10. Tuck the edges of the flaps 10, 11 with a screwdriver 18 as shown in FIG. 13.

Finally, step 1500 follows and involves bending the artificial ears of the polyurethane form to the desired position (including forward, down, or back of horns or antlers etc.) to create a finished game animal 1 mount.

When process is complete, pull flaps 10, 11 above skull open until the clay substance has set up. Once set up, close the flaps 10, 11 and re-tuck around horn 2 or antler bases.

The above-described method creates an odorless trophy that is durable and that will remain intact for decades. Additionally, the method create a trophy that has consistent, lifelike, and more realistic facial features. The method of the present invention is time efficient, inexpensive, and can be performed for game animals 1 of all species, sizes, and sexes.

The kit for implementing the above-described method is provided with an instruction set reflecting the foregoing steps, and preferably also includes an illustrative videotape, DVD, or other suitable recording medium for instructional purposes.

The kit and method described herein may be similarly used and performed on any game animal 1 lacking antlers or horns 2, simply by omitting the details/steps involving the antlers or horns 2. Additionally, the kit and method of the present invention allows antlers or horns 2 that have been mounted on a trophy to be easily interchanged with other antlers or horns 2 within a matter of minutes. This involves pulling the flaps above the skull apart and chiseling the hardened clay 9 that was placed in the form at step 1000 and removing the screws 14 that were placed in step 1200, and then screwing in the new antlers or horns 2 and adding new clay 9. This is especially of interest to a hunter who has a trophy mounted on his wall, and at a later time shoots a larger trophy and wants to very quickly and simply replace the rack 2 on his trophy rather than mount an entirely new trophy. For example, a hunter may have a four point deer trophy hanging on his wall, and at later time he shoots a six pointer. This hunter may not have the space, patience, or monetary resources to hang another deer trophy on his wall, but he can still have his larger prize mounted for display within minutes by replacing the four point rack with the new six point rack with the kit and method of the present invention.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A method of mounting a game animal having antlers or horns, comprising the steps of:
    measuring the game animal and selecting a proper form size based on said measurement;
    taking at least one picture of the game animal for subsequent recall of proper horn/antler placement on the selected form;
    caping the head of the game animal to remove all flesh attached to the horns/antlers;
    after said caping step, cutting the skull of the game animal to remove the skull cap and horns/antlers as an integral piece by sawing through the skull around said antlers or horns to sever a skull cap having a continuous bridge between the antlers or horns;
    after said cutting step, boiling the skull cap of the game animal;
    selecting a fully artificial form in said selected form size, said form comprising at least a head and neck without antlers or horns, a wood mounting base at a crown of said form in place of said antlers or horns, and artificial eyes, ears and fur on said artificial form, and opposing flaps of fur foldable over the wood mounting base at the crown of said form;
    after said cutting step, drilling holes in the skull cap of the game animal for screw-connection of the skull cap to the wood mounting base at the crown of said form;
    after said drilling step, fitting the skull cap with horns/antlers to the wood mounting base at the crown of said form;
    after said fitting step, placing screws through the holes in the skull cap into said wood mounting base;
    after said screwing step, using clay to mold a transition between the wood mounting base at the crown of the form to said skull cap; and
    after said molding step, covering the skull cap attached to the form with said opposing flaps of fur.

2. The method of mounting a game animal having antlers or horns according to claim 1, wherein said caping step further comprises making a first cut from the back of one antler burr to a middle of the head, making a second cut from the back of another opposing antler burr to the middle of the head, said first and second cuts meeting at a point in a V-shape, and making a third cut down the back of the animal's neck to the shoulders, and removing the hide.

3. The method of mounting a game animal having antlers or horns according to claim 1, wherein said form comprises polyurethane.

4. The method of mounting a game animal having antlers or horns according to claim 3, wherein said form includes artificial hair or fur, glass eyes, and movable ears.

5. The method of mounting a game animal having antlers or horns according to claim 1, wherein said covering step further comprises securing the flaps of artificial hair with hook and loop fasteners.

6. A method of mounting a game animal having horns or antlers generally comprising the steps of:
    measuring said game animal;
    taking at least one picture of said game animal;
    partially caping head of said game animal;
    after said partial caping step, cutting through a skull of said game animal around said horns or antlers to remove a skull cap including horns/antlers as an integral piece having a continuous bridge between the antlers or horns;
    after said cutting step, boiling the skull cap of said game animal;
    selecting a fully artificial form to apply the horns or antlers of said game animal, said form comprising at least a head and neck without antlers or horns, a wood mounting base at a crown of said form in place of said antlers or horns, and artificial eyes, ears and fur on said artificial form, and opposing flaps of fur foldable over the wood mounting base at the crown of said form;
    after said cutting step, drilling holes in said skull cap;
    after said drilling step, adding clay to said form;
    fitting said skull to said form;
    after said drilling step, placing screws through said holes in said skull cap into the wood mounting base at the crown of said form ;
    after said screwing step, covering said skull attached to said form with flaps from the artificial hair;
    after said covering step, trimming excess material from said flaps;
    tucking said flaps; and
    bending ears of said form.

7. The method of mounting a game animal having antlers or horns according to claim 1, wherein said caping step further comprises making a first cut from the back of one antler burr to a middle of the head, making a second cut from the back of another opposing antler burr to the middle of the head, said first and second cuts meeting at a point in a V-shape, and making a third cut down the back of the animal's neck to the shoulders, and removing the hide.

8. The method of mounting a game animal having antlers or horns according to claim 1, wherein said form comprises polyurethane.

9. The method of mounting a game animal having antlers or horns according to claim 3, wherein said form includes artificial hair or fur, glass eyes, and movable ears.

10. The method of mounting a game animal having antlers or horns according to claim 1, wherein said covering step further comprises securing the flaps of artificial hair with hook and loop fasteners.

* * * * *